Patented June 1, 1954

2,680,139

UNITED STATES PATENT OFFICE 2,680,139

PROCESS FOR THE PREPARATION OF HYDROPEROXIDES

Maurice Fenoglio, Lyon, and André Pacoud, Saint-Fors, France, assignors to Societe des Usines Chimiques Rhone-Poulenc, Paris, France, a French body corporate No Drawing. Application January 27, 1953, Serial No. 333,596

Claims priority, application Great Britain January 30, 1952

14 Claims. (Cl. 260—610)

This invention is for improvements in or relating to the production of the hydroperoxides of cumene and other aliphatic-aromatic hydrocarbons including the homologues of cumene. It has especial reference to the production of cumene hydroperoxide.

It is known that the hydroperoxides of various hydrocarbons can be prepared by passing oxygen or an oxygen-containing gas through the hydrocarbon in the liquid phase at elevated temperature. The reaction is very slow and passes through an initial induction period during which the absorption of oxygen is practically nil; it is only after the formation of a certain amount of hydroperoxide that the reaction velocity reaches a suitable rate. It is also known that this induction period can be eliminated or, at least, reduced by introducing into the reaction mixture at the commencement an initiator consisting of a hydroperoxide which can be, for example, the hydroperoxide of the hydrocarbon to be oxidised. Furthermore, it is known that in the aforesaid reaction by-products are also formed which exert an inhibiting and retarding action tending to reduce the yield of the desired hydroperoxide; it has been proposed to overcome the injurious effect of these by-products to some extent by adding to the reaction medium various substances such as sodium hydroxide or carbonate, formates, oxalates or benzoates of alkali metals or alkaline earth metals, or benzoic acid. Such substances will be referred to hereinafter as "anti-inhibitors."

It is an object of the present invention to provide a new and unexpectedly useful anti-inhibitor for use in the aforesaid process. A further important object is to provide an improvement in the manufacture of phenolic compounds by the known process involving conversion of certain aliphatic-aromatic hydrocarbons into the corresponding hydroperoxides, decomposition of such hydroperoxides, recovery of un-reacted aliphatic-aromatic starting material and reconversion thereof into hydroperoxide for conversion into the desired phenolic compound.

According to the present invention, a process for the production of hydroperoxides of aliphatic-aromatic hydrocarbons which consist of an aromatic nucleus containing, as sole substituents, at most two aliphatic groups each containing at least two and not more than six carbon atoms, comprises subjecting the said hydrocarbon in the liquid phase to treatment with oxygen at elevated temperature in the presence of formaldehyde.

The aliphatic group or groups may be straight or branched chain or cyclic groups. Examples of hydrocarbons of the class defined are cumene itself (for the conversion of which the invention is of greatest importance), di-isopropyl benzene, isobutyl benzene, ethyl benzene and cyclohexyl-benzene. The oxidation may be effected using substantially pure oxygen gas or a gas containing oxygen, e. g. atmospheric air.

The proportion of formaldehyde used may vary within wide limits, but is preferably of the order of 1 to 5, and preferably about 3, parts per thousand based on the weight of the hydrocarbon. The temperature used for the oxidation may also vary widely but temperatures of the order of 100–120° C. are in general preferred.

It has been found in practice that by carrying out the oxidation of cumene and other aliphatic-aromatic hydrocarbons of the class defined above, in the presence of formaldehyde, the reaction starts very rapidly and the speed of oxidation is increased.

It has also been found that the presence of formaldehyde reduces the harmful effect of the by-products of the reaction so that it is possible to perform the oxidation of the aforesaid hydrocarbons under technically advantageous conditions by the addition of the formaldehyde only and without any of the usual initiators or anti-inhibitors. Nevertheless, if it is desired, the formaldehyde can be used simultaneously with the said initiators and/or anti-inhibitors. In every case investigated, it has been observed that the rate of oxidation, i. e. the proportion of the original hydrocarbon converted into hydroperoxide per hour, is greater in the presence of formaldehyde than in its absence.

An unexpected and commercially extremely important advantage of the invention is that the beneficial effect of the formaldehyde is still exhibited even when the hydrocarbon to be oxidised is contaminated with a trace of the phenolic compound formed on decomposition of the corresponding hydroperoxide. This fact thus renders the present invention of value in the recovery and re-utilisation of unreacted cumene employed as starting material in the manufacture of phenol and acetone by the peroxidation of cumene followed by decomposition of the resulting hydroperoxide, since the heretofore used peroxidation processes required for satisfactory results the thorough elimination of phenol from the recovered cumene, for example, by washing with caustic soda. Not only is a simplification of the over-all process rendered possible with the use of formaldehyde as hereinbefore described, but also the production of secondary unwanted reaction products such as, for example, dimethylphenyl carbinol and acetophenone in the case of the peroxidation of cumene, is low, being generally less than 10% of the hydroperoxide formed, and may even be as low as 5%.

The following examples illustrate the invention. In each of Examples I to VI the oxygen is passed at a rate of 50 litres per hour at atmospheric pressure through 1 litre of hydrocarbon placed in a column and heated to 110° C.

Example I

Cumene alone is submitted to the action of oxygen. The oxidation is very slow. After 1 hour only 0.4% of the cumene has been converted to hydroperoxide. After 2 hours, 0.9% is obtained; after 4 hours, 3%, which represents a mean rate of oxidation of cumene to hydroperoxide of 0.73% per hour.

The experiment is repeated with the addition to the cumene under oxidation of 3 parts per thousand by weight, of formaldehyde in the form of a 34% aqueous solution. After one hour of oxidation 6.6% of cumene is converted to hydroperoxide. After 2 hours the conversion is 14%. A 20% conversion is obtained in 2 hours 50 minutes, which represents a mean rate of oxidation of 7.2% per hour.

Example II

Cumene containing 3.2% of cumene hydroperoxide as initiator is subjected to oxidation. After 1 hour 3% has been oxidised to hydroperoxide. After 2 hours the conversion is 6.4%; after 3 hours, 11.2% and a conversion of 20% is obtained in 4 hours 15 minutes, representing a means rate of oxidation of 4.7% per hour.

The experiment is repeated with the addition of 3 parts per thousand of formaldehyde besides the cumene hydroperoxide. In one hour 9% of the cumene is oxidised to hydroperoxide, 20% conversion being achieved in 2 hours 5 minutes representing a mean rate of oxidation of 9.65% per hour.

Example III

Cumene, to which has been added 0.1 cc. per litre of 36° Bé. caustic soda, is subjected to oxidation. The rate of oxidation remains below 1% for many hours.

The experiment is repeated with the addition of 3 parts per thousand of formaldehyde besides the caustic soda. After one hour 4.1% has been oxidised; after 2 hours, 10.4%; after 3 hours, 15.4% and a conversion of 20% is obtained in 3 hours 35 minutes, corresponding to a mean rate of oxidation of 5.6% per hour.

Example IV 0.1 cc. of caustic soda and 2.9% of cumene hydroperoxide are added to the cumene before oxidation. After one hour 5.5% of cumene is converted; after 2 hours, 11.6%; after 3 hours, 16.6% and a conversion of 20% is obtained in 3 hours 40 minutes, equal to a mean rate of 5.5% per hour.

The experiment is repeated with the further addition of 3 parts per thousand of formaldehyde. After one hour 7.4% of cumene is converted to hydroperoxide; after 2 hours, 18.2% and a conversion of 20% is reached in 2 hours 15 minutes, equal to a mean rate of oxidation of 9% per hour.

The experiment is repeated in the presence of formaldehyde but replacing the caustic soda by 0.1 part per thousand of sodium formate. Under these conditions 9% of the cumene is converted to hydroperoxide in one hour and a conversion of 20% is reached in 2 hours 5 minutes, equal to a mean rate of oxidation of 9.65% per hour.

Example V

Cumene containing 0.3 part per thousand of phenol is subjected to oxidation after addition of 3.6% by weight of cumene hydroperoxide and 0.1 cc. of 36° Bé. caustic soda solution per litre of cumene. The oxidation is slow. In 3 hours only 2.1% of cumene is oxidised, corresponding to a mean rate of 0.7% per hour. At the end of the third hour 3 parts per thousand of formaldehyde are added. The rate of oxidation increases rapidly. In 2½ hours after the time at which the formaldehyde is added 22.1% of the cumene has been converted to hydroperoxide, corresponding to a mean rate of oxidation of 8% per hour from the addition of the formaldehyde.

Example VI (A) Isobutyl benzene containing 0.45 part per thousand of phenol is subjected to oxidation after addition of 0.57% by weight of cumene hydroperoxide as initiator and 0.25% of caustic soda. The hydroperoxide content of the reaction mixture with increasing reaction time was measured.

(B) The process was then repeated with the addition of a 30% aqueous formaldehyde solution to the reaction mixture at the rate of 0.1 part per 100 parts of isobutyl benzene after each half-hour of reaction time. The results of these comparative experiments were as follows:

| Reaction Time (Hours) | A Percent hydroperoxide formed without formaldehyde | B Percent hydroperoxide formed with formaldehyde |
|---|---|---|
| 1 | 0.68 | 1.06 |
| 2 | 1.11 | 2.8 |
| 3 | 1.44 | 4.8 |
| 4 | 2.00 | 6.9 |
| 5 | 2.54 | 8.7 |

Example VII (A) To 850 g. of cyclohexylbenzene was added 20 g. cumene hydroperoxide as initiator and 0.9 g. of caustic soda (36° Bé.). A stream of oxygen was passed through the liquid at 110° C. with vigorous stirring. The hydroperoxide content was determined at intervals of time.

(B) In a second test, 500 g. of cyclohexylbenzene, 12.7 g. of cumene hydroperoxide and 0.9 g. of caustic soda (36° Bé.) was used with the further addition of 2 cc. of aqueous formaldehyde (28%) solution at the start and 0.5 cc. at half-hour intervals thereafter.

The results of the comparative tests were as follows:

| Reaction Time (Hours) | A Percent hydroperoxide calculated as cyclohexylbenzene hydroperoxide (No formaldehyde) | B Percent hydroperoxide calculated as cyclohexylbenzene hydroperoxide (With formaldehyde) |
| --- | --- | --- |
| 1 | 3.31 | 5.14 |
| 2 | 4.01 | 8.81 |
| 3 | 4.91 | 11.3 |
| 4 | 5.87 | 13.3 |
| 5 | 6.66 | 15.4 |
| 6 | 7.61 | 16.4 |
| 12 | 17.5 | |

Taking into account the peroxide originally added, these figures show that for Test A the average speed of oxidation was 0.8% per hour for the first 6 hours and 1.22% per hour for the whole 12 hours, whereas in Test B the speed of oxidation was 2.2% per hour over the period tested.

Thus, there was obtained in 6 hours, by the use of formaldehyde, substantially the same yield of hydroperoxide as is obtained in 12 hours without the formaldehyde.

We claim:

1. A process for the production of hydroperoxides of hydrocarbons which consist of a benzene nucleus containing as sole substituents at most two aliphatic groups each containing at least two and not more than six carbon atoms which comprises subjecting the said hydrocarbon in the liquid phase to treatment with oxygen at elevated temperature in the presence of formaldehyde.

2. A process for the production of hydroperoxides of hydrocarbons which consist of a benzene nucleus containing as sole substituents at most two aliphatic groups each containing at least two and not more than six carbon atoms which comprises subjecting the said hydrocarbon in the liquid phase to treatment with oxygen at elevated temperature in the presence of formaldehyde, and in the presence of a peroxide as reaction initiator.

3. A process for the production of hydroperoxides of hydrocarbons which consist of a benzene nucleus containing as sole substituents at most two aliphatic groups each containing at least two and not more than six carbon atoms which comprises subjecting the said hydrocarbon in the liquid phase to treatment with oxygen at elevated temperature in the presence of formaldehyde in the proportion of 1 to 5 parts per thousand parts of hydrocarbon treated.

4. A process for the production of hydroperoxides of hydrocarbons which consist of a benzene nucleus containing as sole substituent at most two aliphatic groups each containing at least two and not more than six carbon atoms which comprises subjecting the said hydrocarbon in the liquid phase to treatment with oxygen at 100–120° C. in the presence of formaldehyde in the proportion of 1 to 5 parts per thousand parts of hydrocarbon treated.

5. A process for the production of hydroperoxides of hydrocarbons which consist of a benzene nucleus containing a single isoalkyl substituent which comprises subjecting the said hydrocarbon in the liquid phase to treatment with oxygen at elevated temperature in the presence of formaldehyde.

6. A process for the production of cumene hydroperoxide which comprises subjecting cumene in the liquid phase to treatment with oxygen at elevated temperature in the presence of formaldehyde.

7. A process for the production of cyclohexylbenzene hydroperoxide which comprises subjecting cyclohexylbenzene in the liquid phase to treatment with oxygen at elevated temperature in the presence of formaldehyde.

8. A process for the production of di-isopropyl benzene hydroperoxide which comprises subjecting di-isopropyl benzene in the liquid phase to treatment with oxygen at elevated temperature in the presence of formaldehyde.

9. A process for the production of isobutyl benzene hydroperoxide which comprises subjecting isobutyl benzene in the liquid phase to treatment with oxygen at elevated temperature in the presence of formaldehyde.

10. A process for the production of ethyl benzene hydroperoxide which comprises subjecting ethyl benzene in the liquid phase to treatment with oxygen at elevated temperature in the presence of formaldehyde.

11. A process for the production of cumene hydroperoxide which comprises subjecting cumene in the liquid phase to treatment with oxygen at elevated temperature in the presence of formaldehyde, and in the presence of a peroxide as reaction initiator.

12. A process for the production of cumene hydroperoxide which comprises subjecting cumene in the liquid phase to treatment with oxygen at elevated temperature in the presence of formaldehyde in the proportion of 1 to 5 parts per thousand parts of hydrocarbon treated.

13. A process for the production of hydroperoxides of hydrocarbons which consist of a benzene nucleus containing as sole substituents at most two aliphatic groups each containing at least two and not more than six carbon atoms which comprises subjecting the said hydrocarbon in the liquid phase to treatment with oxygen at elevated temperature in the presence of formaldehyde and in the presence of a small proportion of caustic soda.

14. A process for the production of cumene hydroperoxide which comprises subjecting cumene in the liquid phase to treatment with oxygen at elevated temperature in the presence of formaldehyde and in the presence of a small proportion of caustic soda.

No references cited.